«12» United States Patent
Ikawa et al.

(10) Patent No.: US 8,891,103 B2
(45) Date of Patent: Nov. 18, 2014

(54) IMAGE FORMING APPARATUS WHICH CONTROLS THE NUMBER OF JOBS THAT CAN BE EXECUTED SIMULTANEOUSLY

(71) Applicants: Koji Ikawa, Osaka (JP); Toyoaki Oku, Osaka (JP); Muneki Yamada, Osaka (JP)

(72) Inventors: Koji Ikawa, Osaka (JP); Toyoaki Oku, Osaka (JP); Muneki Yamada, Osaka (JP)

(73) Assignee: KYOCERA Document Solutions Inc. (JP)

( * ) Notice: Subject to any disclaimer, the term of this patent is extended or adjusted under 35 U.S.C. 154(b) by 102 days.

(21) Appl. No.: 13/623,761

(22) Filed: Sep. 20, 2012

(65) Prior Publication Data

US 2013/0070283 A1 Mar. 21, 2013

(30) Foreign Application Priority Data

Sep. 20, 2011 (JP) ................. 2011-204747

(51) Int. Cl.
*G06K 15/00* (2006.01)
*G06K 15/10* (2006.01)
*H04N 1/40* (2006.01)
*B41C 1/00* (2006.01)
*H04N 1/00* (2006.01)

(52) U.S. Cl.
CPC ....... *H04N 1/00915* (2013.01); *H04N 1/00925* (2013.01); *H04N 1/0096* (2013.01); *H04N 2201/0094* (2013.01)
USPC ......... 358/1.14; 358/1.8; 358/3.23; 358/3.32; 395/115; 395/116

(58) Field of Classification Search
CPC . H04N 1/00915; H04N 1/0096; G06K 15/00; G06F 21/608
USPC ......... 358/1.14, 1.8, 3.23, 3.32; 395/115, 116
See application file for complete search history.

(56) References Cited

U.S. PATENT DOCUMENTS 6,023,560 A * 2/2000 Yoshida et al. ............. 358/1.16

FOREIGN PATENT DOCUMENTS

JP 10-257281 A 9/1998
JP 2007-164481 6/2007

* cited by examiner

*Primary Examiner* — Firmin Backer
*Assistant Examiner* — Justin Katzwhite
(74) *Attorney, Agent, or Firm* — McDonnell Boehnen Hulbert & Berghoff LLP

(57) ABSTRACT

An image forming apparatus includes: a job control unit configured to impose an execution restriction on a job if the number of simultaneously-executed jobs on a function-to-function basis reaches an upper limit value; a guaranteed job count setting unit configured to set a guaranteed job count, wherein the guaranteed job count provides a guaranteed number of simultaneously-executable jobs on a function-to-function basis; and a shared job count setting unit configured to set a shared job count that can be allocated in common to respective functions, which provides the number of simultaneously-executable jobs.

22 Claims, 4 Drawing Sheets

IMAGE FORMING APPARATUS WHICH CONTROLS THE NUMBER OF JOBS THAT CAN BE EXECUTED SIMULTANEOUSLY

REFERENCE TO RELATED APPLICATIONS

This application is based upon and claims the benefit of priority from the corresponding Japanese Patent Application No. 2011-204747, filed in the Japan Patent Office on Sep. 20, 2011, the entire contents of which are incorporated herein by reference.

BACKGROUND

1. Technical Field

The present disclosure relates to an image forming apparatus capable of controlling the number of jobs that can be executed simultaneously. Unless otherwise indicated herein, the description in this section is not prior art to the claims in this application and is not admitted to be prior art by inclusion in this section.

2. Description of the Related Art

In an image forming apparatus such as a typical copier or a printer, efficiency and smoothness of output processing are achieved by temporarily spooling image data on a scanned original, received print data, or the like in a memory and sequentially performing outputs thereof in executing jobs.

For this reason, in an attempt to simultaneously process a large number of jobs, a delay or an interruption may occur due to excess of a memory capacity. In such a case, an upper limit value (number limit) of the number of simultaneously-executed jobs is defined in advance to restrict execution of the job if the upper limit value is reached.

The number of simultaneously-executable jobs may be controlled based on a priority.

According to this control, the upper limit value of the number of simultaneously-executed jobs is dynamically changed depending on an urgency degree or a requester of the job or depending on an operating ratio of a CPU.

This involves troublesome processing for setting the priority on a job-to-job basis and determining a priority order of the respective jobs.

SUMMARY

An image forming apparatus according to an embodiment of the present disclosure includes a job control unit, a guaranteed job count setting unit, and a shared job count setting unit. The job control unit is configured to impose an execution restriction on a job if the number of simultaneously-executed jobs on a function-to-function basis reaches an upper limit value. The guaranteed job count setting unit is configured to set a guaranteed job count, where the guaranteed job count provides a guaranteed number of simultaneously-executable jobs on a function-to-function basis. The shared job count setting unit is configured to set a shared job count that can be allocated in common to respective functions, which provides the number of simultaneously-executable jobs.

A non-transitory computer-readable recording medium according to an embodiment of the present disclosure has stored thereon a job control program to be executed by a computer of an image forming apparatus. The job control program includes a first program code, a second program code, and a third program code. The first program code causes the computer to impose an execution restriction on a job if the number of simultaneously-executed jobs on a function-to-function basis reaches an upper limit value. The second program code causes the computer to set a guaranteed job count, wherein the guaranteed job count provides a guaranteed number of simultaneously-executable jobs. The third program code causes the computer to set a shared job count that can be allocated in common to respective functions, which provides the number of simultaneously-executable jobs.

A job control method according to an embodiment of the present disclosure includes: (i) imposing, by a job control unit, an execution restriction on a job if the number of simultaneously-executed jobs on a function-to-function basis reaches an upper limit value; (ii) setting, by a guaranteed job count setting unit, a guaranteed job count, wherein the guaranteed job count provides the guaranteed number of simultaneously-executable jobs on a function-to-function basis; and (iii) setting, by a shared job count setting unit, a shared job count that can be allocated in common to respective functions, which provides the number of simultaneously-executable jobs.

Additional features and advantages are described herein, and will be apparent from the following Detailed Description and the figures.

BRIEF DESCRIPTION OF THE DRAWINGS

In the accompanying drawings:

FIGS. 3A to 3C show a transition of a "function-specific job management count setting" screen.

DETAILED DESCRIPTION (Image Forming Apparatus)

An embodiment of the present disclosure is described below with reference to the accompanying drawings. It should be understood that various aspects of the embodiment can be arranged and combined in a wide variety of different ways and configurations, all of which are contemplated herein.

Figure 1:
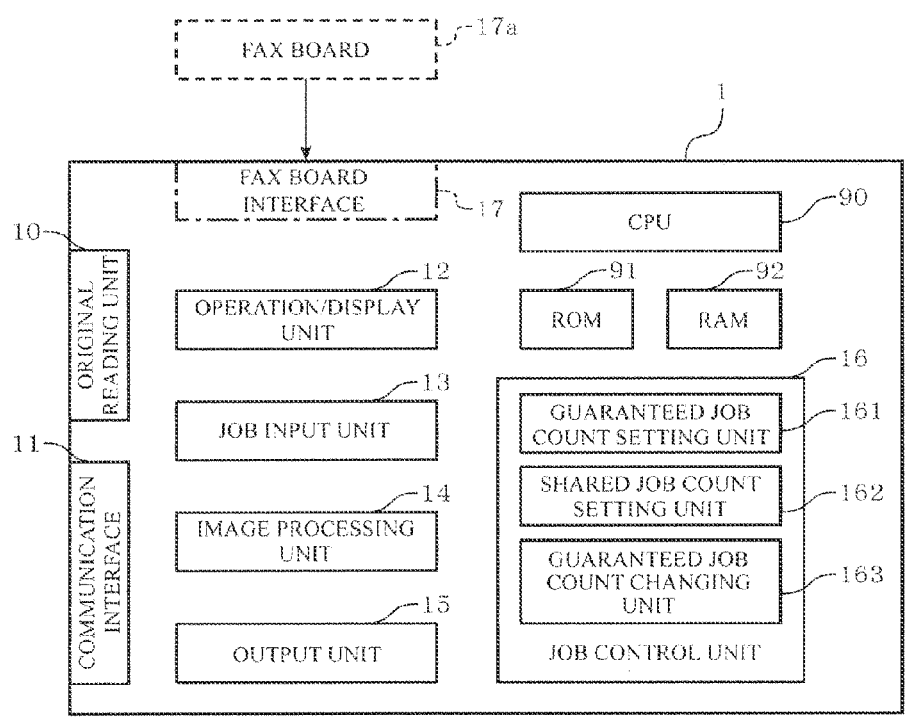
FIG. 1 shows a configuration of an image forming apparatus according to an embodiment of the present disclosure.

FIG. 1 illustrates a configuration of an image forming apparatus that may include a multifunction peripheral (MFP 1) according to the embodiment of the present disclosure.

MFP 1 may include, as illustrated in FIG. 1, central processing unit (CPU) 90 serving as a main control unit, read only memory (ROM) 91, and random access memory (RAM) 92.

ROM 91 may store a job control program that causes CPU 90 to execute a job. Further, ROM 91 may store a program that causes CPU 90 to execute job processing of each of functions of copy, printer, facsimile (FAX), and PC transmission, and has the program read to thereby allow the respective functions to be carried out.

It should be understood that the word "job" as described herein is used to mean one or more tasks to be completed, possibly as instructed by a user of an image forming apparatus. For example, a user of a copy machine may send instructions to the copy machine to complete a job for copying printed paper.

Further, the word "function" as described herein is used to mean one or more actions carried out by an item or machine to execute a job. For example, copiers, printers, fax machines, personal computers, and/or mobile handsets, among other possibilities, may carry out various functions to execute a job.

Considering the previous example, after the instructions are sent to the copy machine, the copy machine may carry out a function for receiving and/or reading the instructions to copy the printed paper. Further, the copy machine may also carry out a separate function for scanning and extracting data from the printed paper. Yet further, the copy machine may then carry out another function for making duplicate paper copies of the printed paper. Other possibilities may exist.

RAM 92 is a memory that may be used as a work area in which CPU 90 temporarily spools data in executing those programs.

MFP 1 may include, as illustrated in FIG. 1, original reading unit 10, communication interface 11, operation/display unit 12, job input unit 13, image processing unit 14, output unit 15, job control unit 16, and FAX board interface 17.

Original reading unit 10 may be a scanner that may read an original set on an original tray (not illustrated) to acquire image data in accordance with a copy operation or the like performed through operation/display unit 12. Original reading unit 10 may output the acquired image data to image processing unit 14.

Communication interface 11 may be connected to a telephone line, a LAN, or the like, and may transmit and/or receive print data and FAX data to/from an external apparatus such as a personal computer, tablet computer, FAX apparatus, and/or cell phone, among other possibilities (not illustrated).

Operation/display unit 12 is disposed in an outer periphery of a top part of a main body (not illustrated) of MFP 1, and allows for one or more input operations to be performed by a user of MFP 1 and displays various screens for the user.

Figure 2:
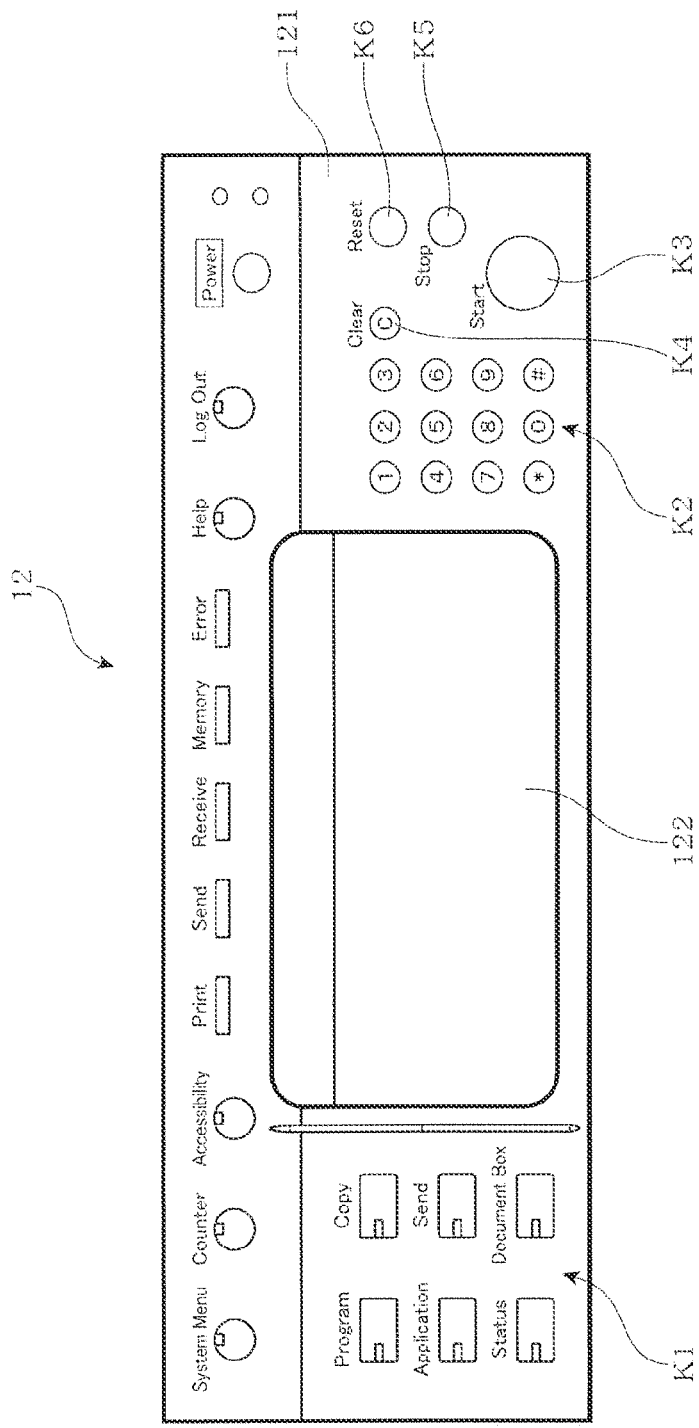
FIG. 2 shows an operation/display unit.

Operation/display unit 12 may include, for example, as illustrated in FIG. 2, operation part 121 that accepts an operation instruction from the user and display part 122 that displays information for the user.

Operation part 121 may allow the user to perform various settings relating to an image output and an input operation for starting image processing. Operation part 121 may be provided with keys including: function selection keys K1 used to select the execution of the jobs such as copy, scanner, printing, and FAX; numerical keypad K2 that may be used to input numbers such as the number of prints and the number of print copies; start key K3 used to start the execution of the job after setting; clear key K4 used to cancel each kind of setting last performed through operation part 121; stop key K5 used to interrupt the started job; and reset key K6 used to cancel all the various settings and recover initial settings. In some embodiments, keys may be added to operation part 121 for additional functionalities and in some instances, keys may be removed from operation part 121, among other possibilities (not illustrated).

Display part 122 may operate using a liquid crystal display panel. In some embodiments, display part 122 may operate using touch-sense technology, which may send and/or receive instructions to/from CPU 90. Further, in some embodiments, display part 122 may display an operation status and an execution result of MFP 1, various setting values input through operation part 121, and/or a message for the user, among other possibilities.

Further, in some embodiments, display part 122 may have a touch panel function (e.g., using touch-sense technology) for accepting a selection operation, and may also accept inputs of the various setting values corresponding to different kinds of operation screens.

Figures 3A, 3B, 3C:
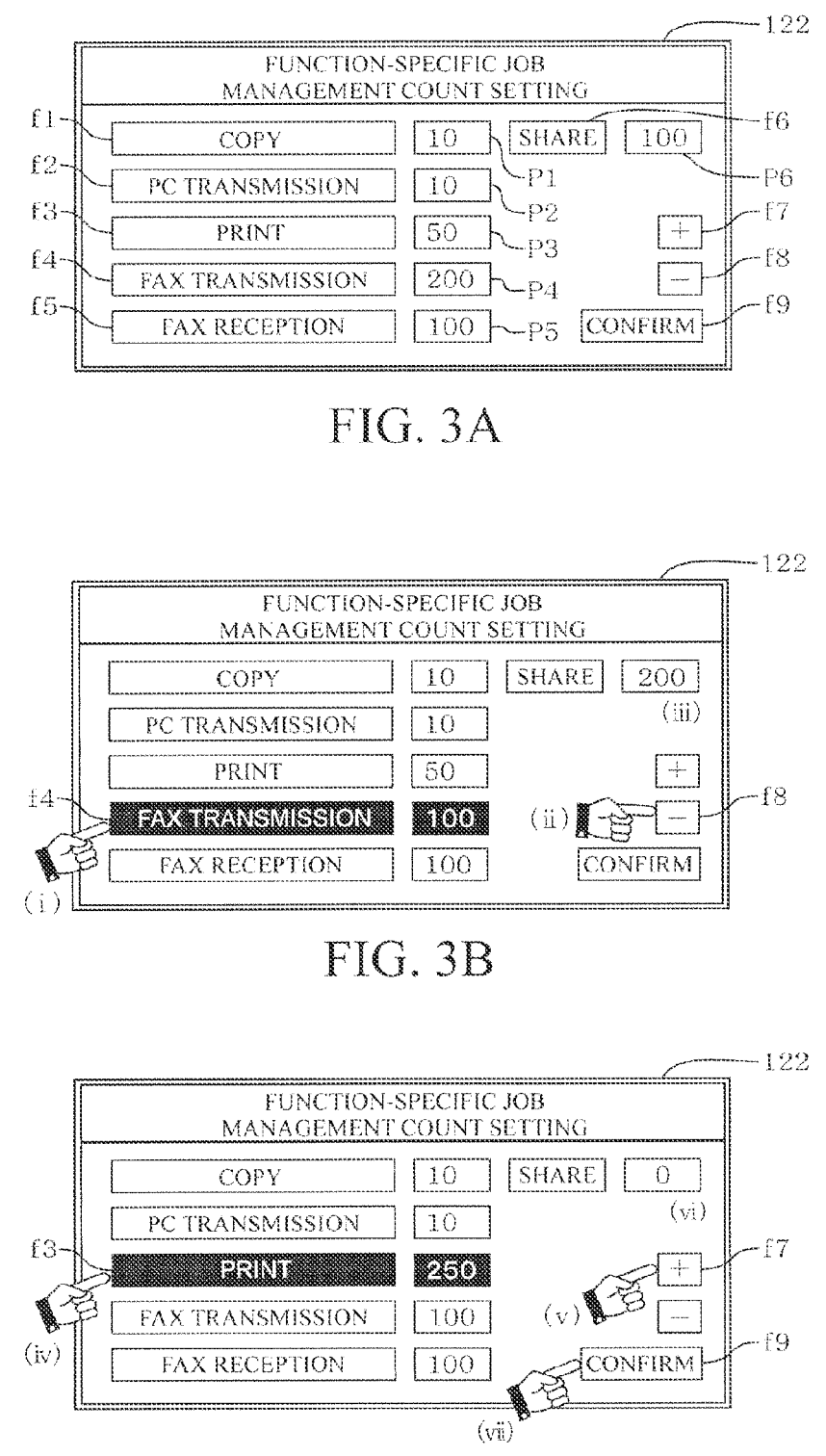

For example, display part 122 may display a "function-specific job management count setting" screen (see FIGS. 3A to 3C). In some embodiments, a human finger touching each kind of key displayed on the screen may change the guaranteed value (guaranteed job count) on a function-to-function basis and/or a shared value (shared job count) of the number of simultaneously-executed jobs.

It should be understood that the changing of the guaranteed job count and the shared job count by using the "function-specific job management count setting" screen is described in detail later in the section titled, "Method of changing the guaranteed job count and the shared job count".

As illustrated in FIG. 1, job input unit 13 may receive inputs of the image data read by original reading unit 10 and job data such as the print data and the FAX data received via the communication interface 11, and outputs the same to image processing unit 14.

Image processing unit 14 may interpret the job data input from job input unit 13, and perform image processing. For example, image processing unit 14 may perform color conversion processing, image density correction processing, and/or halftone screen processing, among other possibilities. This image processing may be performed for a job before or in conjunction with printing the image.

Image processing unit 14 outputs the job subjected to the image processing to output unit 15.

Output unit 15 outputs the image and data obtained through the above-mentioned image processing.

Example embodiments for outputting the image and/or data may include a print engine used for printing an image, displaying a copy of the original image read by the scanner, producing an image from the received print data, and/or producing a FAX image, among other possibilities.

Job control unit 16 performs different kinds of control based on the number of simultaneously-executed jobs.

For example, if detecting that the number of simultaneously-executed jobs reaches an upper limit value (number limit) pre-defined in advance, job control unit 16 may perform processing by rejecting a new job and notifying the user to that effect through display part 122 as a basic control operation. This can prevent overwork of the memory.

Further, in addition to the above-described basic control, job control unit 16 may control settings. For example, job control unit 16 may increase and/or reduce the function-to-function-basis guaranteed job count and the shared job count in accordance with various functions and the number of simultaneously-executed jobs.

In some embodiments, job control unit 16 may include functional blocks such as guaranteed job count setting unit 161, shared job count setting unit 162, and guaranteed job count changing unit 163.

In some embodiments, guaranteed job count setting unit 161 may set the guaranteed job count guaranteed as the number of simultaneously-executable jobs on a function-to-function basis.

In some embodiments, the number set as the guaranteed job count provides that a resource (e.g., memory) being used for the function is guaranteed to be available within a system. Further, the guaranteed job count represents the number of simultaneously-executable jobs that are always guaranteed to be executable without allowing the resource to be used for another function.

In the MFP 1 according to this embodiment, the guaranteed job count can be set for copying, PC transmission, printing, FAX transmission, and FAX reception.

However, the guaranteed job count is restricted so that a total value of the guaranteed job counts for the respective functions is less than or equal to a specific permitted value. This is because there is a limitation on the resource such as the memory in which the jobs are spooled.

For example, consider a case where the specific permitted value is 470 jobs. If the respective guaranteed job counts are set to 10 jobs for the copy, 10 jobs for the PC transmission, 50 jobs for the printing, 200 jobs for the FAX transmission, and 100 jobs for the FAX reception, the total value thereof is 370 jobs, which enables the settings.

It should be understood that the guaranteed job count can be set in advance at a time of manufacturing, or can be set by the user through communication interface 11 or operation/display unit 12.

Shared job count setting unit 162 sets the shared job count that can be allocated according to the respective functions to reflect the number of simultaneously-executable jobs.

Specifically, a value obtained by subtracting the total value of the guaranteed job counts from the specific permitted value is set as the shared job count.

In the previously-described example, the specific permitted value was 470 jobs with the total value of the guaranteed job counts being 370 jobs, and hence a remainder of 100 jobs (=470−370) is set as the shared job count.

Further, in some embodiments, the "shared job count" is a value obtained by subtracting the guaranteed job count allocated to the respective functions from a total number of simultaneously-executable jobs that can be executed with a given resource (e.g., the memory at its maximum capacity).

In accordance with the input operation, guaranteed job count changing unit 163 increases the guaranteed job count corresponding to an arbitrary function within a range of the shared job count or reduces the guaranteed job count within a range of the original guaranteed job count.

Here, if the guaranteed job count corresponding to the arbitrary function is increased by the execution of guaranteed job count changing unit 163, shared job count setting unit 162 subtracts the increased number from the shared job count. If the guaranteed job count corresponding to the arbitrary function is reduced, shared job count setting unit 162 adds the reduced number to the shared job count.

Effective use of a resource such as memory is achieved by enabling the resource to be reserved as a shared resource while also enabling the resource to be reserved as a resource dedicated to each function.

FAX board interface 17 transmits a signal indicating a mounted/removed state of a FAX board 17a to job control unit 16. Shared job count setting unit 162 and guaranteed job count changing unit 163 of job control unit 16 detect the mounted/removed state of FAX board 17a based on the signal received from FAX board interface 17.

(Method of Changing the Guaranteed Job Count and the Shared Job Count)

Here, a procedure for changing the guaranteed job count and a method of changing the shared job count are described in detail with reference to FIGS. 3A to 3C.

FIGS. 3A to 3C illustrate a transition of the "function-specific job management count setting" screen displayed by display part 122. Further, a setting screen is displayed when the guaranteed job count or the shared job count is changed.

FIG. 3A illustrates the "function-specific job management count setting" screen first displayed at a time of activation or other such time.

As illustrated in FIG. 3A, copy key f1, PC transmission key f2, print key f3, FAX transmission key f4, FAX reception key f5, share key f6, plus (+) key f7, minus (−) key f8, and confirm key f9 are displayed as operation keys on the "function-specific job management count setting" screen.

Further displayed on the same screen are boxes P1 to P5 for displaying the setting values of the function-specific guaranteed job counts and box P6 for displaying the setting value of the shared job count.

Note that, as illustrated in FIG. 3A, it is assumed that the initial values of the respective guaranteed job counts are set to 10 jobs for the copy, 10 jobs for the PC transmission, 50 jobs for the printing, 200 jobs for the FAX transmission, and 100 jobs for the FAX reception and that the initial value of the shared job count is set to 100 jobs. However, other possibilities may also exist.

Here, for example, as illustrated in FIG. 3B, after selecting FAX transmission key f4 (i), if minus key f8 is kept pressed to change the guaranteed job count corresponding to the FAX transmission from 200 to 100 (ii), the guaranteed job count for the FAX transmission is reduced by 100, and hence the reduced amount of 100 is added to the shared job count, which becomes 200 (iii).

Subsequently, as illustrated in FIG. 3C, after selecting print key f3 (iv), if plus key f7 is kept pressed to change the guaranteed job count corresponding to the printing from 50 to 250 (v), the increased amount of 200 is subtracted from the shared job count, which becomes 0 (vi).

Then, by selecting confirm key f9, the values after the change are confirmed to update the guaranteed job count and the shared job count (vii). Further, in some embodiments, the guaranteed job count changing unit changes the guaranteed job count corresponding to the FAX transmission from 200 to 100 and the guaranteed job count corresponding to the printing from 50 to 250, and the shared job count setting unit sets the shared job count to 0.

With this configuration, in accordance with the operation of the user, the guaranteed job count corresponding to the arbitrary function can be increased or reduced, and this increase/reduction can be used to increase or reduce the shared job count.

Next, a description is made of a control operation of the job control unit.

Figure 4:
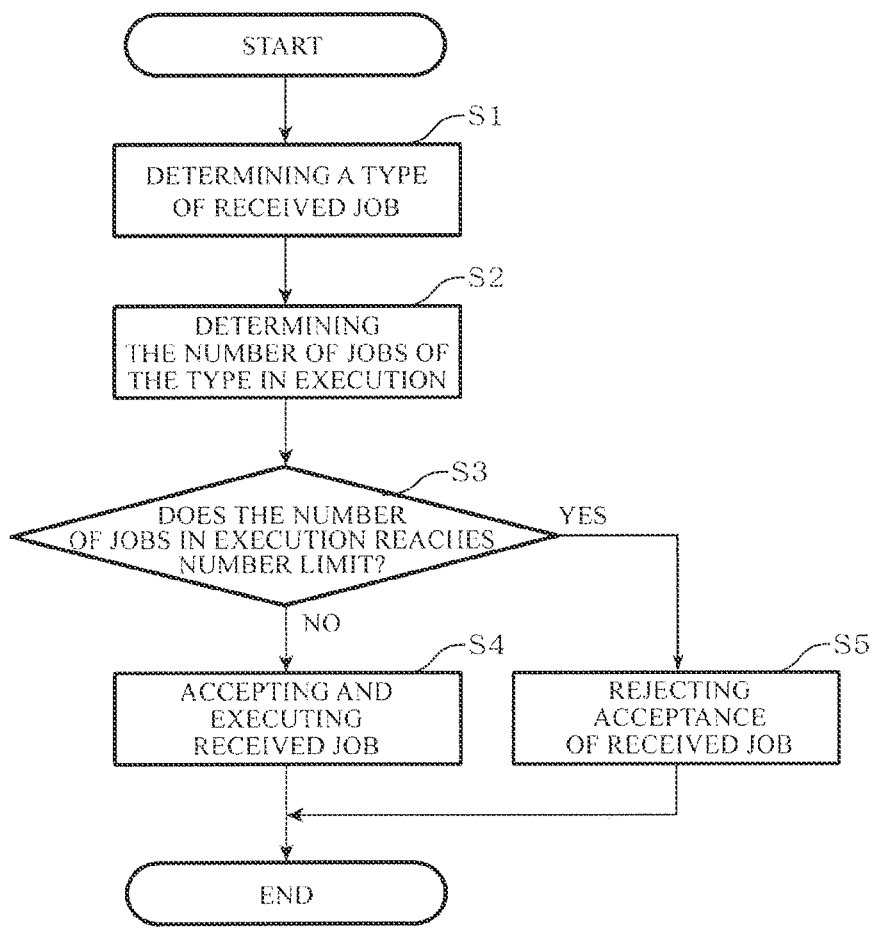
FIG. 4 shows a control operation of a job control unit.

FIG. 4 illustrates the control operation of the job control unit.

As illustrated in FIG. 4, the job control unit determines a type of received job (Step S1), determines the number of jobs of the type in execution (including ones that have not been executed yet) (Step S2), and compares the number of jobs in execution with the number limit of the jobs of the type (Step S3).

Incidentally, the "number limit (upper limit value)" of the subject jobs is defined based on the guaranteed job count corresponding to the function of the type of job and the shared job count.

For example, in the case where the guaranteed job count corresponding to the FAX transmission is set to 100 and the shared job count is set to 200, the number limit corresponding to a FAX transmission job is 300 (=100+200) at maximum. Further, if the number of the other simultaneously-executed jobs in execution is less than or equal to the guaranteed job count, the shared job count is not used, and hence, in such a case, the total value of the shared job count and the guaranteed job count is the number limit (i.e., the maximum value).

However, if the number of the other simultaneously-executed jobs in execution exceeds the guaranteed job count, the excess amount is allocated from the shared job count. For this reason, when the excess amount is a jobs, the number limit is (300−α) jobs.

Then, if the number of jobs in execution is less than the number limit, the job control unit accepts the received job. Then the received job is executed (Step S4).

On the other hand, if the number of jobs in execution reaches the number limit, the job control unit rejects the acceptance of the received job (Step S5). Note that, in this case, the job control unit informs the operation/display unit that the acceptance of the received job has failed, and display part 122 displays an error indicating the failure.

With this configuration, according to the image forming apparatus of this embodiment, by setting the guaranteed job count on a function-to-function basis, a job corresponding to multiple functions can be positively executed within the range of the setting value.

Further, by complementarily defining the shared job count in association with the guaranteed job count, it is possible to obtain the upper limit value (number limit) of the number of simultaneously-executed jobs within the range whose minimum value is the guaranteed job count and whose maximum value is a value obtained by adding the guaranteed job count and the shared job count.

In addition, the guaranteed job count is changed on a function-to-function basis, and the change allows the upper limit value to be changed.

For this reason, it is possible to flexibly handle a use pattern and a use environment of the user and to smoothly execute the job.

(Other Embodiments)

In some embodiments, an image forming apparatus may be manufactured such that a specific function cannot be executed without mounting an optional device represented by the FAX board. For example, as illustrated in FIG. 1, there may be an MFP that cannot perform the FAX transmission or the FAX reception without mounting FAX board 17a in FAX board interface 17.

Here, considering a case where FAX board 17a is not mounted, the FAX transmission or the FAX reception cannot be performed. Therefore, it is wasteful and unnecessary to reserve the resources (e.g., memory) of the system for the FAX transmission/reception. For this reason, to effectively use resources, it is desired that the resources that are unnecessary be added to the shared job count or the guaranteed job count for other possible functions other than FAX transmission or receiving.

Therefore, in this embodiment, if it is detected that such an optional device is not mounted, the shared job count setting unit 162 adds to the shared job count. In some instances, the shared job count setting unit 162 adds to the shared job count the guaranteed job count typically set for a specific function when the optional device is properly mounted. Further, in some instances, the shared job count setting unit 162 adds to the shared job count the guaranteed job count that was previously set.

In some embodiments, the guaranteed job count changing unit 163 sets the guaranteed job count corresponding to the specific function to zero, or disables the guaranteed job count corresponding to the specific function. If the mounting of the optional device is detected, guaranteed job count changing unit 163 may add the added shared job count to the guaranteed job count corresponding to the specific function (zero), or may enable the guaranteed job count, which may have been disabled. At this time, shared job count setting unit 162 may subtract the added value from the shared job count.

Alternatively, if it is detected that the optional device is not mounted, guaranteed job count changing unit 163 may distribute the guaranteed job count to the guaranteed job counts for other functions. For example, guaranteed job count changing unit 163 may distribute the guaranteed job count typically set for a specific function provided by mounting the optional device. Further, in some instances, guaranteed job count changing unit may distribute the guaranteed job count that was previously set.

It should be understood that an arbitrary method can be used as a distribution method, such as even distribution to the respective functions or distribution based on a ratio set for each function. Other possibilities may also exist.

Here, guaranteed job count changing unit 163 sets the guaranteed job count corresponding to the specific function to zero, or disables the guaranteed job count corresponding to the specific function that may no longer be available. If the mounting of the optional device is detected, guaranteed job count changing unit 163 may add the distributed guaranteed job count to the guaranteed job count corresponding to the specific function (zero), or may enable the guaranteed job count that has been disabled. At this time, guaranteed job count changing unit 163 may subtract the value that has been distributed from the guaranteed job counts for the other functions.

With this configuration, it is possible to more effectively use the limited resource and to much more smoothly execute the job relating to the function in operation.

(Job Control Program)

Next, a description is made of the job control program.

The job control program operates as respective components of the image forming apparatus according to the above-described embodiments by being read and executed by a control unit (such as a CPU) of a computer of the image forming apparatus. Accordingly, the image forming apparatus performs job control such as changing of the upper limit value of the above-described number of simultaneously-executed jobs.

The job control program is not limited to being stored in a ROM or a hard disk drive of the computer but can also be stored in a computer-readable recording medium, for example, an external storage device and/or a portable recording medium, among other possibilities.

The external storage device includes an additional memory device which incorporates a recording medium such as a compact disc-read only memory (CD-ROM) and which is connected externally to the image forming apparatus. Meanwhile, the portable recording medium represents a portable recording medium that can be inserted to a recording media drive (drive device), for example, a flexible disk, a memory card, and a magneto-optical disk.

Then, the program stored in the recording medium is loaded into a RAM or the like of the computer and executed by the CPU.

In addition, in a case where the job control program is loaded by the computer, the computer can use a communication line to download programs which are held by other computers onto the RAM or the external storage device which is owned by the computer itself. The downloaded programs are also executed by the CPU.

As provided by the description above, according to the image forming apparatus and the job control program of this embodiment, the upper limit value of the number of simultaneously-executed jobs can be freely customized as an arbitrary value having a dynamic range. Therefore, it is possible to perform smooth execution of the job suitable for the use pattern and the use environment of the user.

The image forming apparatus and the job control program according to the embodiment of the present disclosure are described above, but the present disclosure is not limited only to the above-described embodiments, and it should be understood that different kinds of changes can be made within the scope of the present disclosure.

For example, the above-described embodiments are in the case of taking an example of the MFP, but an information processing device such as a personal computer which has a plurality of functions and in which the resource such as the memory is shared can be also applied as the image forming apparatus according to the present disclosure. This can apply the present disclosure to a wide range of technical fields.

Further, the above-described embodiments are in the case of using a mode in which the shared job count is changed by guaranteed job count changing unit 163 performing the processing for changing the guaranteed job count, but the shared job count can be changed directly.

In this case, a difference that has occurred due to the changing of the shared job count may be allocated as the guaranteed job count corresponding to the arbitrary function, or may be distributed as the guaranteed job counts corresponding to at least two functions.

Accordingly, it is possible to improve operability for the user and further enhance convenience.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
    a job control unit configured to impose an execution restriction on a job if a number of simultaneously-executed jobs on a function-to-function basis reaches an upper limit value;
    a guaranteed job count setting unit configured to set a guaranteed job count, wherein the guaranteed job count provides a guaranteed number of simultaneously-executable jobs on the function-to-function basis; and
    a shared job count setting unit configured to set a shared job count that can be allocated in common to respective functions, which provides the number of simultaneously-executable jobs,
    wherein if a number of other simultaneously-executed jobs is less than or equal to the guaranteed job count, the upper limit value is a maximum value, wherein the maximum value is obtained by adding the guaranteed job count and the shared job count, and
    wherein if the number of the other simultaneously-executed jobs exceeds the guaranteed job count, the upper limit value is obtained by subtracting an excess amount allocated to the other simultaneously-executed jobs from the maximum value.

2. The image forming apparatus according to claim 1, wherein:
    the guaranteed job count setting unit is configured to set the guaranteed job count so that a total value of the guaranteed job counts for the respective functions is less than or equal to a specific permitted value; and
    the shared job count setting unit is configured to set the shared job count by subtracting the total value from the permitted value.

3. The image forming apparatus according to claim 1, further comprising a guaranteed job count changing unit configured to perform, in accordance with an input operation, at least one of: increasing of the guaranteed job count corresponding to an arbitrary function within a range of the shared job count; and reducing of the guaranteed job count within a range of the guaranteed job count,
    wherein if the guaranteed job count is increased, the shared job count setting unit is configured to subtract the increased number from the shared job count, and wherein if the guaranteed job count is reduced, the shared job count setting unit is configured to add the reduced number to the shared job count.

4. The image forming apparatus according to claim 1, further comprising a guaranteed job count changing unit configured to perform, if it is detected that a device essential for carrying out a specific function is not mounted, at least one of: setting the guaranteed job count to zero; and disabling the guaranteed job count,
    wherein the shared job count setting unit is configured to add the guaranteed job count corresponding to the specific function to the shared job count.

5. The image forming apparatus according to claim 1, further comprising a guaranteed job count changing unit configured to distribute, if it is detected that a device essential for carrying out a first function is not mounted, a first guaranteed job count corresponding to the first function to a second guaranteed job count corresponding to a second function, and to perform at least one of: setting of the first guaranteed job count corresponding to the first function to zero; and disabling of the first guaranteed job count corresponding to the first function.

6. The image forming apparatus according to claim 1, wherein the guaranteed job count setting unit is configured to set the guaranteed job count for simultaneously executing at least two of the following jobs: copying, PC transmission, printing, FAX transmission, and FAX reception.

7. The image forming apparatus according to claim 6, wherein the guaranteed job count setting unit modifies the guaranteed job count in accordance with changes to simultaneously executing the at least two jobs.

8. A non-transitory computer-readable recording medium having stored thereon a job control program to be executed by a computer of an image forming apparatus, the job control program comprising:
    a first program code that causes the computer to impose an execution restriction on a job if a number of simultaneously-executed jobs on a function-to-function basis reaches an upper limit value;
    a second program code that causes the computer to set a guaranteed job count, wherein the guaranteed job count provides a guaranteed number of simultaneously-executable jobs on the function-to-function basis; and
    a third program code that causes the computer to set a shared job count that can be allocated in common to respective functions, which provides the number of simultaneously-executable jobs,
    wherein if a number of other simultaneously-executed jobs is less than or equal to the guaranteed job count, the upper limit value is a maximum value, wherein the maximum value is obtained by adding the guaranteed job count and the shared job count, and
    wherein if the number of the other simultaneously-executed jobs exceeds the guaranteed job count, the upper limit value is obtained by subtracting an excess amount allocated to the other simultaneously-executed jobs from the maximum value.

9. The non-transitory computer-readable recording medium according to claim 8, wherein:
    the second program code causes the computer to set the guaranteed job count so that a total value of the guaranteed job counts for the respective functions is less than or equal to a specific permitted value; and
    the third program code causes the computer to set the shared job count by subtracting the total value from the permitted value.

10. The non-transitory computer-readable recording medium according to claim 8, the job control program further comprising a fourth program code that causes the computer to perform, in accordance with an input operation, at least one of: increasing of the guaranteed job count corresponding to an arbitrary function within a range of the shared job count; and reducing of the guaranteed job count within a range of the guaranteed job count,
wherein if the guaranteed job count is increased, the third program code causes the computer to subtract the increased number from the shared job count,
and wherein if the guaranteed job count is reduced, the third program code causes the computer to add the reduced number to the shared job count.

11. The non-transitory computer-readable recording medium according to claim 8, the job control program further comprising a fifth program code that causes the computer to perform, if it is detected that a device essential for carrying out a specific function is not mounted, at least one of: setting the guaranteed job count to zero; and disabling the guaranteed job count,
wherein the third program code causes the computer to add the guaranteed job count corresponding to the specific function to the shared job count.

12. The non-transitory computer-readable recording medium according to claim 8, the job control program further comprising a sixth program code that causes the computer to distribute, if it is detected that a device essential for carrying out a first function is not mounted, a first guaranteed job count corresponding to the first function to a second guaranteed job count corresponding to a second function, and to perform at least one of: setting the first guaranteed job count corresponding to the first function to zero; and disabling the first guaranteed job count corresponding to the first function.

13. The non-transitory computer-readable recording medium according to claim 8, the job control program further comprising a seventh program code that causes the computer to set the guaranteed job count for simultaneously executing at least two of the following jobs: copying, PC transmission, printing, FAX transmission, and FAX reception.

14. The non-transitory computer-readable recording medium according to claim 13, the job control program further comprising an eighth program code that causes the computer to modify the guaranteed job count in accordance with changes to simultaneously executing the at least two jobs.

15. A job control method, comprising:
imposing, via a job control unit, an execution restriction on a job if a number of simultaneously-executed jobs on a function-to-function basis reaches an upper limit value;
setting, via a guaranteed job count setting unit, a guaranteed job count, wherein the guaranteed job count provides the guaranteed number of simultaneously-executable jobs on the function-to-function basis; and
setting, via a shared job count setting unit, a shared job count that can be allocated in common to respective functions, which provides the number of simultaneously-executable jobs,
wherein if a number of other simultaneously-executed jobs is less than or equal to the guaranteed job count, the upper limit value is a maximum value, wherein the maximum value is obtained by adding the guaranteed job count and the shared job count, and
wherein if the number of the other simultaneously-executed jobs exceeds the guaranteed job count, the upper limit value is obtained by subtracting an excess amount allocated to the other simultaneously-executed jobs from the maximum value.

16. The job control method according to claim 15, wherein:
the guaranteed job count setting unit sets the guaranteed job count so that a total value of the guaranteed job counts for the respective functions is less than or equal to a specific permitted value; and
the shared job count setting unit sets the shared job count by subtracting the total value from the permitted value.

17. The job control method according to claim 15, further comprising performing, via a guaranteed job count changing unit, in accordance with an input operation, at least one of: increasing of the guaranteed job count corresponding to an arbitrary function within a range of the shared job count; and reducing of the guaranteed job count corresponding to an arbitrary function within a range of the guaranteed job count,
wherein if the guaranteed job count is increased, the shared job count setting unit subtracts, the increased number from the shared job count,
and wherein if the guaranteed job count is reduced, the shared job count setting unit adds the reduced number to the shared job count.

18. The job control method according to claim 15, further comprising performing, via a guaranteed job count changing unit, if it is detected that a device essential for carrying out a specific function is not mounted, at least one of: setting the guaranteed job count to zero; and disabling the guaranteed job count,
wherein the shared job count setting unit adds the guaranteed job count corresponding to the specific function to the shared job count.

19. The job control method according to claim 15, further comprising distributing, via a guaranteed job count changing unit, if it is detected that a device essential for carrying out a first function is not mounted, a first guaranteed job count corresponding to the first function to a second guaranteed job count corresponding to a second function, and performing at least one of: setting the first guaranteed job count corresponding to the first function to zero; and disabling the first guaranteed job count corresponding to the first function.

20. The job control method according to claim 15, further comprising setting, via the guaranteed job count setting unit, the guaranteed job count for simultaneously executing at least two of the following jobs: copying, PC transmission, printing, FAX transmission, and FAX reception.

21. An image forming apparatus, comprising:
a job control unit configured to impose an execution restriction on a job if the number of simultaneously-executed jobs on a function-to-function basis reaches an upper limit value;
a guaranteed job count setting unit configured to set a guaranteed job count, wherein the guaranteed job count provides a guaranteed number of simultaneously-executable jobs on a function-to-function basis;
a shared job count setting unit configured to set a shared job count that can be allocated in common to respective functions, which provides the number of simultaneously-executable jobs;
a guaranteed job count changing unit configured to perform, if it is detected that a device essential for carrying out a specific function is not mounted, at least one of: setting the guaranteed job count to zero; and disabling the guaranteed job count,
wherein the shared job count setting unit is configured to add the guaranteed job count corresponding to the specific function to the shared job count.

22. An image forming apparatus, comprising:
- a job control unit configured to impose an execution restriction on a job if the number of simultaneously-executed jobs on a function-to-function basis reaches an upper limit value;
- a guaranteed job count setting unit configured to set a guaranteed job count, wherein the guaranteed job count provides a guaranteed number of simultaneously-executable jobs on a function-to-function basis;
- a shared job count setting unit configured to set a shared job count that can be allocated in common to respective functions, which provides the number of simultaneously-executable jobs;
- a guaranteed job count changing unit configured to distribute, if it is detected that a device essential for carrying out a first function is not mounted, a first guaranteed job count corresponding to the first function to a second guaranteed job count corresponding to a second function, and to perform at least one of: setting of the first guaranteed job count corresponding to the first function to zero; and disabling of the first guaranteed job count corresponding to the first function.

* * * * *